United States Patent [19]

Changnian et al.

[11] Patent Number: 4,972,870
[45] Date of Patent: Nov. 27, 1990

[54] MULTI-FUNCTION STATIC-ERRORLESS PRESSURE CONTROL VALVE

[76] Inventors: Liu Changnian, Section 303, Beijing University of Aeronautics and Astronautics, Beijing, China; Chen Zhe, Section 301, Beijing University of Aeronautics, Beijing, China; Liu Silan, 14-1-401 Beijing University of Aeronautics and Astronautics, Beijing, China

[21] Appl. No.: 405,929

[22] Filed: Sep. 12, 1989

[30] Foreign Application Priority Data

May 19, 1989 [CN] China .............................. 89103298.3

[51] Int. Cl.$^5$ .......................................... G05D 16/10
[52] U.S. Cl. ................................... 137/269; 137/488; 137/492.5
[58] Field of Search ............... 137/269, 270, 488, 492, 137/492.5

[56] References Cited

U.S. PATENT DOCUMENTS

| | | | |
|---|---|---|---|
| 3,083,726 | 4/1963 | Woelfel | 137/488 X |
| 3,227,171 | 1/1966 | Woelfel | 137/488 X |
| 3,602,246 | 8/1971 | Hettinger | 137/270 |
| 3,730,214 | 5/1973 | Brumm | 137/488 X |
| 4,129,141 | 12/1978 | Vogeli | 137/488 X |

FOREIGN PATENT DOCUMENTS 229841 6/1986 Fed. Rep. of Germany .

Primary Examiner—Alan Cohan
Attorney, Agent, or Firm—James R. Longacre; Michael L. Keller

[57] ABSTRACT

The invention relates to a brandnew multi-function static-errorless pressure control method and the valve thereof, in which a cylindrical two-side three-way valve is used as the pilot valve 20 and an asymmetric double-action differential hydraulic cylinder is used as the main valve 10 to constitute an 1-type static-errorless closed-loop negative feedback control system, a transfer means with special oil network connects to the oil circuits 1, 2, 8 and ports 4, 5, 9, L of the system and makes the valve to correspond to six operating modes of the relief valve, remote control relief valve, constant valve pressure reducing valve, constant difference pressure reducing valve, internal control sequence valve and external control sequence valve respectively. The test results have shown that the static error of the pressure control valve of present invention is 0.5%, the overshoot is less than 5%, and no self-excitation is found.

10 Claims, 3 Drawing Sheets

MULTI-FUNCTION STATIC-ERRORLESS PRESSURE CONTROL VALVE

The present invention relates to a multi-function static-errorless pressure control method and a pressure control valve based on it, which belongs to a pilot-type pressure control valve, i.e. a two-stage valve composed of a pilot valve and a main valve and is an essential device for controlling and regulating oil pressure in the hydraulic system.

As it is well known, there is a variely of pilot-type pressure valves, including the relief valve, the remote-control relief valve, the constant value pressure reducing valve, the constant difference pressure reducing valve, the internal control sequence valve and the external control sequence valve, etc. . Each of them has only a single function, and the structures of those valves differ from each other, which have brought the production and manufacturing process a lot of trouble.

By now the pilot-type pressure valves usually adopt the cone type of direct action pressure valve as the pilot valve for controlling the degree of opening of the conic orifice of the main valve in order to keep a nearly constant oil pressure. The main preformance indexes of the pressure valve are its static accuracy and dynamic performance, which directly influence on the quality of the hydraulic system. Therefore, how to improve the static accuracy and stability of the pressure valve has always been an important problem to study.

In order to reduce the static errors of the pilot-type pressure valves, for many years a lot of improvements have been made in their structures and manufacturing process, which have somewhat reduced their static errors. For example, the open-and-shut errors of the relief valves made by some firms have been reduced to about 5%. But the problem of static errors has not been solved thoroughly, as there is a theroetic error in those valve which is impossible to be eliminated. A commonly-used relief valves as shown in FIG. 6 may help us to explain the problem. The oil pressure $P'_1$ balanced by pressure regulating spring 34 of pilot valve 31 is not equal to the controlled pressure $P_1$, but it is equal to the pressure of controlled oil which are twice throttled by throttling orifices 37 and 38. When the seating 36 of the pilot valve 31 is closed by its spool 35, the oil located before and after throttling orifices 37 and 38 does not flow and at that time the r oil pressure $P'_1$ is equal to the controlled pressure $P_1$ as well as the set pressure $P_{10}$ of the valve, i.e. $P'_1 = P_1 = P_{10}$. When the relief is needed, the controlled pressure $P_1$ will be raised, thus the pilot spool 35 will move rightward, forming an annular orifice (pilot valve orifice) between the seating 36 of the pilot valve 31 and its spool 35, and therefore part of the oil will flow through the throttling orifices 37, 38 and the pilot orifice and then return to the oil tank. As the spring 34 of cone valve is pressed additionally, its balancing oil pressure $P'_1$ will rise, i.e. $P'_1 \, P_{10}$, meanwhile, the pressure of the twice throttled will be less than that of before throttling, i.e. $P'_1 \, P_1$, apparently $P_1$ is much larger than the set pressure $P_{10}$. That is the basic reason for the pilot-type pressure valve used today to have large static error. This valve is obviously a system with static error from the viewpoint of control. In addition, it should be noted that the instability of the conic pilot valve may cause self-excitation and squeal in it, which leads to environmental pollution and failure in pressure control.

Recently, cylindrical pilot valves are used to improve their stability, but they still cannot solve the problem of static error as well. For instance, in the European patent application EP0229841 cylindrical spools are used for both main valve and pilot valve of the pressure reducing valve, and the spools can slide in the cylindrical chambers of the cooresponding valve bodies. There are annular grooves in the cylindrical chambers, which communicate with the inlet, the outlet and the return port. The diameter of said annular groove is larger than that of the corresponding cylindrical chamber, which makes the liquid flow in the form of horn divergence in relation to the axis of spool in order to maintain the stability of the movement of spool and to prevent the vibration and noise. However, there are at least three shoulders on a spool of such structure and three annular grooves in the cylindrical chamber correspondingly. The high accuracy of machining is required for both of the annular grooves and shoulders, so it will certainly lead to the high cost of production. On the other hand, as the oil pressure at the outlet of the main valve is larger than that in the chamber which being throttled and the latter pressure is used to balance the set pressure of the pilot valve, which will cause the static error. Moreover, there is no feedback between the main valve and the pilot valve and there is no any open loop control and therefore there is no way to eliminate the influence 5 of the hydrodynamic force, the spring force and other interference forces, which may cause the static error. The above-mentioned problems are the two basic reasons of the large static error of such valves. In addition, the normally open pilot valve has large leakage.

As stated above, there are two problems which are impossible to be solved in the pressure control methods of prior art and the pressure control valves: firstly, they are singlefunction, but not multifunction valves and their structures are different from each other and not interchangeable; secondly, all of those valves are control systems with static errors which are impossible to be eliminated.

The task of the present invention is to provide a brandnew multi-function static-errorless pressure control method and a pressure control valve based on it.

The invention has adapted the control theory in the design of the pressure control method and the valve and has radically changed the traditional design principles. In the pressure control method of present invention, a simple transfer means is used to make the designed pressure control valve to serve as an relief valve, a remot control relief valve, a constant value pressure reducing valve, a constant difference pressure reducing valve, an internal control sequence valve and an external control sequence valve etc., which leads to a lot of advantages, such as simplification and normalization of the design of various pressure valves, reduction of product series, reduction of manufacturing process and equipment, simplification of production and assembly and reduction of cost.

The pressure control method in accordance with the invention and the pressure control valve designed according to this method will thoroughly eliminate the static error and have such advantages as better dynamic performance, less leakage, etc. .

In order to achieve the task of the invention, the present pressure control method has used an l-type static- errorless closed-loop negative feedback control system which are composed of a pilot valve and a main valve and has used a special transfer means of oil circuit network to communicate every oil channel and ports of the system to make up a multi-function static-errorless pressure control system. In accordance with the invention, a cylindrical two-side three-way valve is used as the pilot valve and an asymmetric double-action differential hydraulic cylinder is used as the main valve. A conic orifice is located in the lower part of the main valve for controlling the amount of oil flow. The oil pressure on the left of the pilot spool is balanced by the spring force on its right. As the oil flow from the controlled pressure chamber has not passed through the throttling orifice, the oil pressure at present is the controlled pressure $P_1$ but net $P'_1$ as stated in the prior art. There are two orifices in the pilot sleeve communicated respectively with high pressure oil and return oil circuit. The intermediate chamber formed by the neck of pilot spool communicates with the upper chamber of the main valve, and the lower chamber of the main valve communicates with the inlet of high pressure oil. Therefore the opening degree of the conic orifice of the main spool may be controlled with the help of the displacement of the pilot spool. As the pilot spool bears the controlled pressure $P_1$ of the valve, and the main spool acts as an integrating element, this the present invention is an l-type static-errorless closed-loop negative feedback pressure control system. As the pilot valve shows excellent structural stability, and the open loop gain of the system can be regulated by means of changing the area gradient of the control orifice in the pilot sleeve, the system represents excellent stability, low noise, small overshoot, short transient time, etc. . Moreover, the transfer means can put the valve into six operating modes, such as relief valve, remote control relief valve, constant value pressure reducing valve, constant difference pressure reducing valve, internal control sequence valve, and external control sequence valve, etc..

Further description and explanation in more details will be given below with reference to the embodiments shown in the attached drawings for the multi-function static-errorless pressure control method in accordance with the invention and the pressure control valve based on it.

Figure 1:
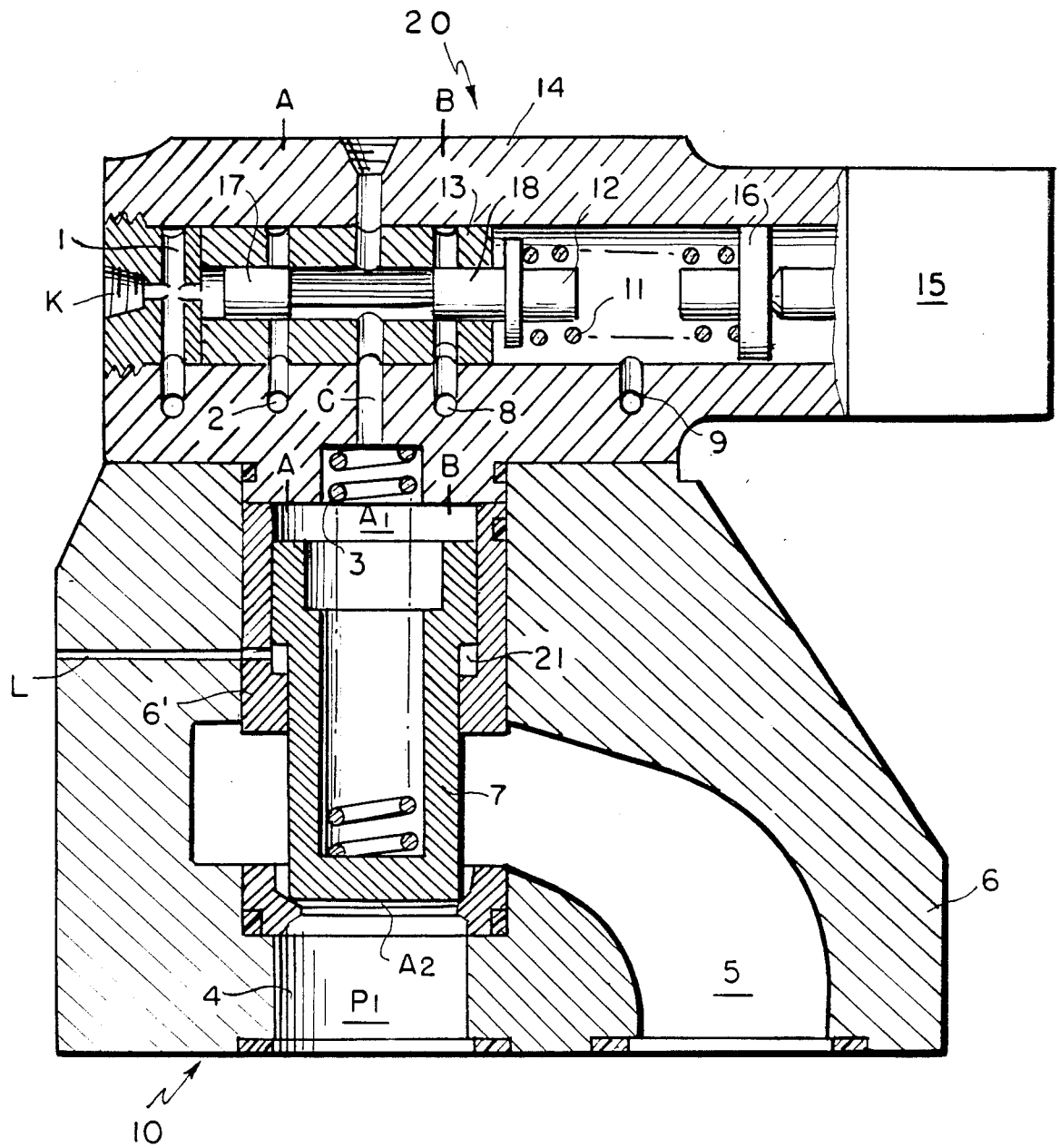
FIG. 1 is a sectional schematic diagram of pressure control valve in accordance with the invention.
Figure 2:
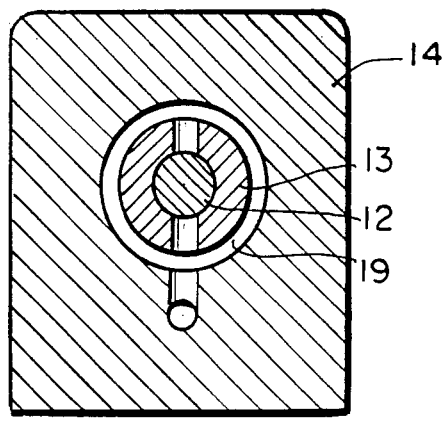
FIG. 2 is a partly sectional view along line A—A or B—B in FIG. 1.
Figure 6:
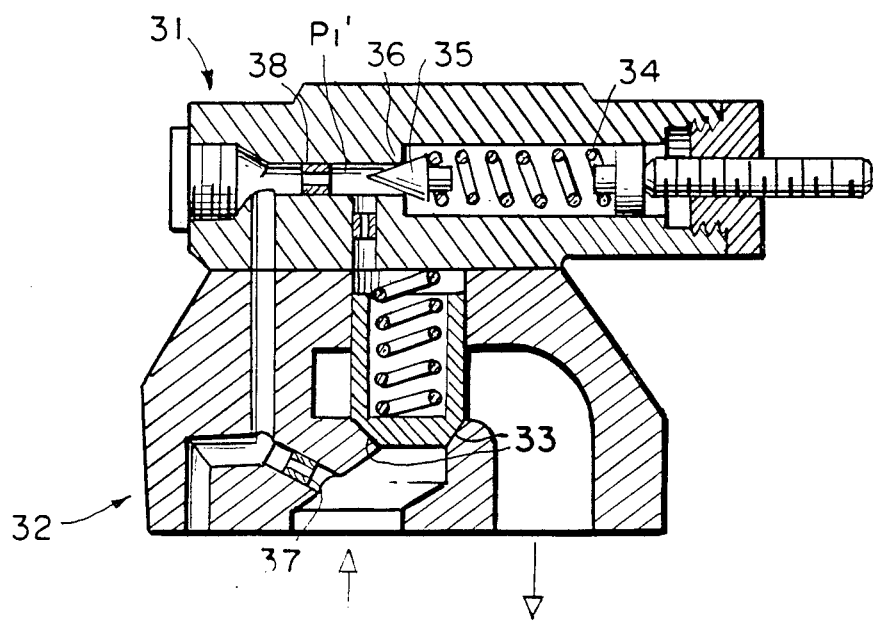
FIG. 6 is a sectional structural diagram of a relief valve of prior art.
Figure 3:
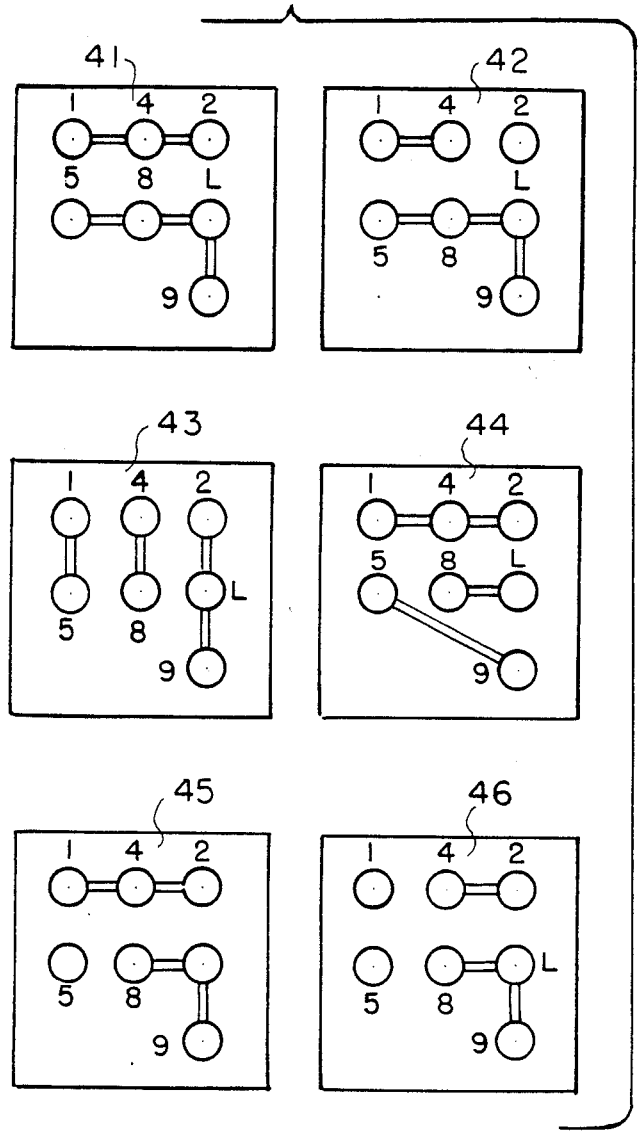
FIG. 3 is a schematic diagram of the multi-function transfer plate of the pressure control valve in FIG. 1.
Figure 4:
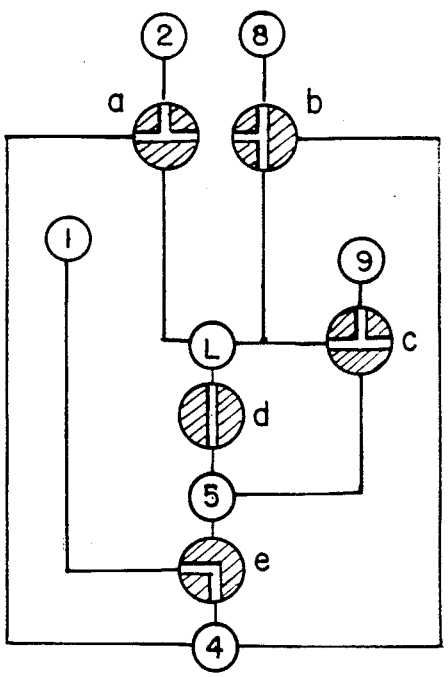
FIG. 4 is a schematic diagram of the multi-function oil circuit network of the pressure control valve in FIG. 1.

It is known from FIG. 1 that the pressure control valve of present invention comprises a main valve 10 and a pilot valve 20. In the main valve 10 there is a main spool 7, which is a plunger with a shoulder on its top end and can slide in the main sleeve 6' of the main valve 10. The ratio of areas of the upper and lower sections of the plunger (A1/A2) is 1.4 to 2.0. In the chamber of the main spool 7 there is a main valve spring 3. In the main valve body 6 there is a main sleeve 6' with a conic orifice at its lower end, above and below which are arranged the inlet 4 and the outlet 5 of the main valve respectively. The pilot valve 20 is provided with a pilot spool 12 which has two shoulders 17 and 18 and can slide in the pilot sleeve 13 fitted in the body 14 of the pilot valve. The pilot spool 12 has spring seat 16 on its right end to fix the left end of the pressure regulating spring 11, the other end of the spring 11 is connected with a manual pressure regulator or a linear electric magnet 15 by means of the spring seat 16. As shown in FIG. 1 and FIG. 2, there are two oil inlet or (return) orifices in the pilot sleeve 13, which are composed of round holes with diameter 2.0 to 2.5 mm which are perpendicular to the axis of the pilot sleeve 13. Outside the holes there are annular collector grooves 19 communicated respectively with oil circuits 2 and 8. The chamber at the left end of the pilot spool 12 is communicated with the controlled oil chamber and remote control port K through the controlled oil inlet circuit 1. The closed chamber on the right of the pilot spool 12 is provided with an oil passage port 9. Said controlled inlet oil circuit 1, and inlet/return orifices of oil circuits 2 and 8 as well as the oil passage port 9 are located inside the body 14 the pilot valve. The upper chamber of the main valve 10 is communicated with the chamber between the neck of the spool 12 of pilot valve 20 and its sleeve 13 by means of oil circuit C. The annular chamber 21 between the neck of the main spool 7 near to its shoulder and the main sleeve 6' is communicated with the drain port L to return oil, whose oil circuit gets through sleeve 6' and body 6 of the main valve 10. Said controlled inlet oil circuit 1, inlet or return orifices of oil circuit 2 and 8 and oil passage port 9 may be communicated with an integrated plane on the outside surface of the main valve body 6. Similarly, the inlet 4, the outlet 5 and drain port L of the main valve 10 may be communicated with the same integrated plane. The arranged configuration and relative position of the seven ports 1, 2, 4, 5, 8, 9 and L are the same as that of the seven corresponding ports on the transfer plate shown in FIG. 3. If said integrated plane is covered by a selected special transfer plate with oil circuit network as shown in FIG. 3 for connecting the oil circuits concerned, a pressure control valve of required function is constituted, because the oil circuit networks arranged on the transfer plate 41, 42, 43, 44, 45 and 46 shown in FIG. 3 correspond to the operating modes of relief valve, remote control relief valve, constant value pressure reducing valve, constant difference pressure reducing valve, internal control 1. sequence valve and external control sequence valve respectively. In another multi-function embodiment, five cylindrical transfer cocks "a", "b", "c", "d" and "e" are provided in the valve body, each of transfer cock having a T-, or L- or I-shaped passage in the plane which is perpendicular to the cock's axis. The passages in the cocks communicate with said oil circuits and ports as shown in FIG. 4 to form the multi-function network of the invention. In order to increase the stability margin of the system the oil circuit on the side of cocks a and b are provided with throttling orifices. The third multi-function embodiment provides a transfer cock in the valve body, in which is arranged a special oil circuit network and it communicates with the corresponding oil circuits and ports of the valve. Each 60 degree turning of the cock represents a operating position of the valve, so there are six operating positions corresponding to the relief valve, remote-control relief valve, constant value pressure reducing valve, constant difference pressure-reducing valve, internal control sequence valve and external control sequence valve respectively.

A detailed description of the functioning of the pressure control valve is given as follows with reference to the oil circuit network shown in FIG. 4.

1. Relief valve

The oil circuit network shown in FIG. 4 represents the operating mode of relief valve. In this case the controlled oil from the inlet 4 of the main valve flows through cock e to the inlet oil circuit 1 in the pilot valve 20, applying a hydraulic force onto the left end of the pilot spol 12, which balances the preload applied by the pressure regulating spring 11 to the right end of the spool 12. If the spool is in the neutral position, i.e. the two shoulders 17 and 18 of spool 12 just block up the inlet orifice communicated with oil circuit 2 and the return oil orifice communicated with the oil circuit 8 in the pilot sleeve 13 respectively, then the pressure $P_1$ of the controlled oil is equal to the preset pressure value $P_{10}$, i.e. the system is balanced. If the flow at the inlet 4 of the main valve increases abruptly, the oil pressure $P_1$ will increase and then the pilot spool 12 will move rightward. The oil will return by means of the main valve 7 through the return oil orifice circuit 8, cock b, main valve drain port L, cock d and outlet 5 of main valve. The main spool 7 will move upwards under the action of the high pressure oil in the lower chamber, opening or increasing the opening of the conic orifice which leads to the reduction of $P_1$. When $P_1$ returns to the preset value, the pilot spool 12 returns to the neutral position and the system will be in a new balanced state again. If the flow at the inlet 4 of the main valve decreases abruptly, $P_1$ will reduce and the pilot spool 12 will move leftward, opening the orifice to oil circuit 2. Thus the high pressure oil from inlet 4 of the main valve will pass through cock a and oil circuit 2 to the upper chamber of the main valve 10. As the effective area A1 of the upper chamber is larger than the effective area A2 of the lower chamber, the main spool 7 is forced to move downwards and to close the conic orifice so as to increase $P_1$. When $P_1$ regains its preset value, the pilot spool 12 returns to its neutral position, putting the system into a new balanced state. Apparently, in any balanced states of the valves designed on the basis of the multi-function static-errorless pressure control method in accordance with the invention their pilot valves are in the normally-closed condition, and have no any relation to the flow, which results in small leakage and negligible static errors. In addition, the leakage oil from the oil passage port 9 shown in FIG. 1 drains through cocks "c" and "d" into the outlet port 5 of the main valve, and the leakage oil from the drain port L of the main valve also drains through cock d into the outlet 5 of the main valve, because port L is closed in the case of relief valve.

2. Remote control relief valve

Figure 5:
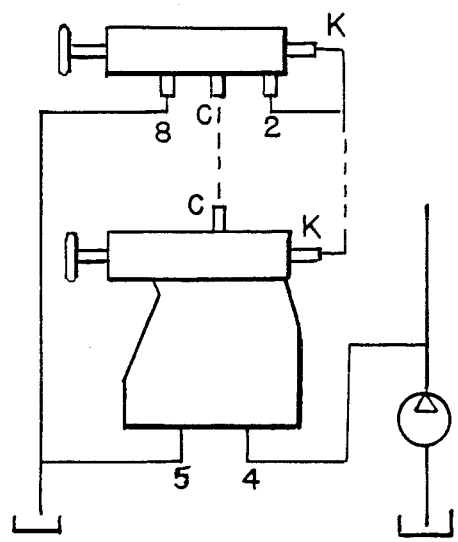
FIG. 5 is a schematic dia of the remote control pressure regulating loop.

If the cock "a" shown in FIG. 4 is turned by 45 degrees clockwise, the orifice to oil circuit 2 is closed, the valve in accordance with the invention becomes a remote control relief valve. In this case the manual pressure regulator 15 should be set in the limit position in which the pressure is maximum. As a result, the spring seat at the right end of the pilot spool 12 is close to the right end-face of the pilot sleeve 13, the orifice to oil circuit 8 is closed, and the opened orifice to oil circuit 2 is closed by cock "a". Therefore the pilot valve will lose its control function. If the pilot valve 20 in accordance with the invention is used as a remote pressure regulating valve and its oil circuits are connected as shown in FIG. 5, a remote control pressure regulating loop is formed.

3. Constant value pressure reducing valve

It will change the valve of present invention into a constant value pressure reducing valve to turn the cocks "a", "b" and "e" in FIG. 4 in clockwise by 90 degrees. In this case the orifice to oil circuit 2 communicates with the oil drain port L of the main valve, and said oil drain port 2 communicates with the oil tank by means of a throttling orifice. The orifice to oil circuit 8 communicates with inlet 4 of the main valve, the inlet oil circuit 1 communicates with the outlet 5 of the main valve, which in turn communicates with the drain port L with the help of the cock "d" to meet the closed load, because the port L is communicated with the oil tank in the case of pressure reducing valve. Obviously, the outlet oil pressure $P_2$ of the main valve is a controlled quantity. When $P_2$ increases because of the change of the load, the pilot spool 12 will move rightwards and the orifice to oil circuit 8 will be opened. The high pressure oil from the inlet 4 of the main valve will pass through cock "b" into the upper chamber of the main valve 10, moving the main spool 7 downwards to reduce the opening of the conic orifice until $P_2$ returns to its preset value, and then the pilot spool 12 returns to the neutral position. If $P_2$ reduces because of load changing, the pilot spool 12 will move leftwards, the upper chamber of the main valve 10 will communicate through the orifice to oil circuit 2, and cock "a" with the drain port L of the main valve. The main spool 7 moves upwards under the action of the high pressure oil from the inlet 4 of the main valve, which will increase the opening of the conic orifice and then raise $P_2$ until $P_2$ returns to the preset value and the pilot spool 12 returns to its neutral position. In this case the system is static-errorless.

4. Constant difference pressure reducing valve It will change the valve of present invention into a constant difference pressure reducing valve by turning the cock C in FIG. 4 in clockwise by 90 degrees. In this case the controlled value of the valve is the difference of the inlet oil pressure of the main valve and the load pressure at the outlet, i.e. $P_1$-$P_2$. Thus the oil from the outlet 5 of the main valve flows through cock "c" to the oil passage port 9.

5. Internal control sequence valve

Turning the cock "d" in FIG. 4 by 90 degrees will change the valve of present invention into a internal control sequence valve. In the condition that the inlet oil pressure $P_1$ is less than the preset value $P_{10}$, the pilot spool 12 will move leftwards and the high pressure oil from the inlet 4 of the main valve will pass through the cock "a", the oil circuit 2 and its orifice into the upper chamber of the main valve 10 to move the main spool 7 downwards and to close the conic orifice. In the condition that said $P_1$ is slightly larger than $P_{10}$, the pilot spool 12 will return to its substantially neutral position (slightly to the right) and permit the oil from the upper chamber of the main valve 10 to return through the orifice of oil passage circuit 8 and cock "b" into the oil drain port L of the main valve so that to open the conic orifice. As the outlet 5 of the main valve communicates with the load, $P_1$ does not decrease with the opening of the conic orifice, thus an open-loop control is formed and the main spool will move upwards until to its limit position. The pressure loss is near to zero, and the leakage is very little.

6. External control sequence valve

Turning the cocks "d" and "e" in FIG. 4 in anticlockwise by 90 degrees will change the valve of present invention into an external control sequence valve, which differs from the internal control sequence valve in that in the pilot valve 20 the inlet oil circuit 1 is disconnected from the inlet 4 of the main valve, and so taht the external control oil passes through the remote control port K and enters into the inlet of the inlet oil circuit 1.

7. Proportional pressure valve

Replacing the manual pressure regulator 15 in FIG. 1 with a linear electric magnet will change the valve of present invention into a proportional pressure valve.

The test results of the technical performances of the pressure control valve designed according to the multi-function static-errorless pressure control method of the invention have been shown that in all operating modes for the pilot valve and the whole pressure valve no self-excited oscillation occurs and the pressure is steady and its fluctuation value and deviantion valve are only about 0.5%. On the other hand, the open-and-shut accuracy is high because it is static-errorless, e.g. the open-and- shut error of the relief valve is only 0.5%. As to its dynamic performance for an relief valve of rated pressure of 31.5 MPa and rated flow of 100 1/min, its pressure overshoot is less than 5%, its transient recovery time is 14 ms and its unloading time is 20 ms.

Many variations of the structure from the invention may be made on the basis of the principles of this invention. But all of them will be included in the scope of protection of the present invention provided that they do not violate the essential spirit of the invention.

1. Inlet oil circuit
2. Oil circuit
3. Main valve spring
4. Main valve inlet
5. Main valve outlet
6. Main valve body
7. Main spool
8. Oil circuit
9. Oil passage port
10. Main valve
11. Pressure regulating spring
12. Pilot spool
13. Pilot sleeve
14. Pilot valve body
15. Pressure regulator
16. Spring seat
17. Shoulder of pilot spool
18. Shoulder of pilot spool
19. Annular coolector grooves
20. Pilot valve
21. Annular chamber
31. Pilot valve
32. Main valve
33. Conic orifice of main valve
34. Spring of cone valve
35. Pilot spool
36. Pilot valve seat
37. Throttling orifice
38. Throttling orifice
C. Oil circuit
L. Oil drain port
K. Remote control port
41–46 transfer plate

What is claimed:

1. A pressure control valve comprising a pilot valve and a main valve, wherein said pilot valve is a cylindrical two-side three-way valve, said main valve is an asymmetric double action differential hydraulic cylinder, said pilot valve and said main valve make up an l-type static-errorless closed loop negative feedback pressure control system; said main valve having an inlet port, an outlet port, an oil drain port and an upper chamber; said pilot valve having shoulder portions for controlling pilot flow and for actuating said pilot valve in response to pressure, said pilot valve having three oil circuit ports one of which is connected to the upper chamber of said main valve and the other two are adapted to be connected to said main valve inlet port, to said main valve outlet port, or to said oil drain port, said pilot valve also having at least one additional port connected to the pressure responsive end of the shoulder portion of said pilot valve for actuating said pilot valve; transfer means for connecting different ones of said pilot valve oil circuit ports and said additional port with different ones of said main valve inlet, outlet and drain port for forming a multi-function pressure control valve.

2. A pressure control valve as claimed in claim 1, wherein said pilot valve comprises a pilot spool having two shoulders and having a neck between said two shoulders, a spring seat being arranged on the right end of said pilot spool to fix the left end of a pressure regulating spring and the other end of said spring being connected with means for regulating pressure by means of said spring seat, said pilot sleeve having two round holes which are perpendicular to the axis of said sleeve for forming two oil inlet/return orifices of said pilot valve, an annular collector grooves being provided outside said round holes and connected with oil circuits respectively, a chamber at the left end of a pilot spool being connected through controlled oil inlet circuit to controlled oil chamber and a remote control port, a closed chamber at the right end of said pilot spool being provided with a oil passage port said pilot valve body being provided with a controlled oil inlet circuit and inlet/return orifice of oil circuits which are connected with corresponding ports and orifices of said pilot sleeve respectively.

3. A pressure control valve as claimed in claim 1, wherein said main valve comprises a main spool which is a plunger with a shoulder at its upper end and a conic orifice at its lower end, a main valve inlet being provided at the lower portion of said conic orifice and a main valve outlet of said conic orifice being provided at the upper portion of said conic orifice, an annular chamber being formed between said neck of said main spool near to its shoulder and a main sleeve, said annular chamber being communicated with said oil drain port L to return oil, the oil circuit of said drain port L in turn passes through said main sleeve and main valve body.

4. A pressure control valve as claimed in claim 1, wherein the upper chamber of said main valve communicates with the chamber which is formed by the neck of said pilot spool and said pilot sleeve through oil circuit.

5. A pressure control valve as claimed in 1, wherein said oil circuit and ports constitute a multi-function network by means of a group of cylindrical transfer cocks, said one of the transfer cocks is provided with T-, or L- or I-shaped passage on a plane which is perpendicular to the cock's axis, and as each transfer cock turns to different position, said passage may communicate to different oil circuits or ports, therefore the five different position arrangements for said cocks putting said pressure control valve into operating modes of relief valve, remote control relief valve, constant value pressure reducing valve, constant difference pressure reducing valve, internal control sequence valve and external control pressure reducing valve respectively.

6. A pressure control valve as claimed in claim 2, wherein said pressure regulating spring which is located on the right of said pilot spool is balanced with the hydraulic forces formed by the controlled oil on the left of said pilot spool, and so to return said pilot spool to its neutral position at the stable state to form a normally closed pilot valve.

7. A pressure control valve as claimed in claim 3, wherein a ratio of the upper and lower sections of the plunger $A_1/A_2$ of said main spool is 1.4–2.0.

8. A pressure control valve as claimed in claim 2, wherein said mean for regulating pressure is a manual pressure regulator.

9. A pressure control valve as claimed in claim 2, wherein said means for regulating pressure is a linear-electromagnet which may be used to constitute a proportioning pressure valve.

10. A pressure control valve as claimed in claim 2, wherein the diameters of said two round holes which are perpendicular to the axis of said pilot sleeve are 2 to 2.5 mm.

* * * * *